United States Patent
Oshita et al.

[11] Patent Number: 5,652,291
[45] Date of Patent: Jul. 29, 1997

[54] AQUEOUS DISPERSION OF URETHANE VINYL COMPOSITE RESIN

[75] Inventors: Shinichi Oshita, Himeji; Kunihiro Iwaizumi, Kakogawa; Iwao Sugiyama, Kobe, all of Japan

[73] Assignee: Seiko Chemical Industries Co., Ltd., Hyogo-ken, Japan

[21] Appl. No.: 502,082

[22] Filed: Jul. 14, 1995

[51] Int. Cl.$^6$ ............ C08L 75/04; C09D 175/04; C08J 3/05
[52] U.S. Cl. ............ 524/457; 524/591; 524/798; 524/839; 524/840; 525/455; 528/71; 528/75
[58] Field of Search ............ 524/457, 591, 524/798, 839, 840; 528/71, 75; 525/455

[56] References Cited

U.S. PATENT DOCUMENTS

| | | | |
|---|---|---|---|
| 3,705,164 | 12/1972 | Honig et al. | 524/591 |
| 3,791,857 | 2/1974 | Balle et al. | 117/164 |
| 4,636,545 | 1/1987 | König et al. | 524/457 |
| 4,644,030 | 2/1987 | Koewrigkeit et al. | 524/457 |
| 5,137,961 | 8/1992 | Goos et al. | 524/457 |
| 5,173,526 | 12/1992 | Vijayendran et al. | 524/457 |

FOREIGN PATENT DOCUMENTS

| | | |
|---|---|---|
| 59-157102 | 9/1984 | Japan . |
| 63-14723 | 4/1988 | Japan . |
| 63-14735 | 4/1988 | Japan . |
| 63-37809 | 7/1988 | Japan . |
| 64-10549 | 2/1989 | Japan . |
| 128067 | 5/1989 | Japan . |
| 128068 | 5/1989 | Japan . |
| 1197513 | 6/1989 | Japan . |

Primary Examiner—Rabon Sergent
Attorney, Agent, or Firm—Morrison Law Firm

[57] ABSTRACT

An aqueous dispersion containing urethane vinyl composite resin which exhibits superior dispersability properties. The composite resin is obtained by graft polymerizing vinyl monomers with dispersable polyurethane. The polyurethane exhibits an acid value of at least 20. The dispersable polyurethane is obtained by reacting a urethane prepolymer having isocyanate groups at its end with a polyol compound obtained by the semi-esterification of polycarboxylic acid with benzene rings or its anhydride with trimethylol ethane or trimethylol propane. The urethane prepolymer is produced by reacting polyol compounds with poly-isocyanate compounds and ranges in molecular weight of from about 800 to 3000.

8 Claims, No Drawings

AQUEOUS DISPERSION OF URETHANE VINYL COMPOSITE RESIN

BACKGROUND OF THE INVENTION

The present invention relates to an aqueous dispersion of a resin which is useful for evenly dispersing pigments in paint, printing ink, and similar mediums. More particularly, the present invention is directed to an aqueous dispersion of a urethane vinyl composite resin which exhibits superior pigment dispersability properties. The contemplated aqueously dispersed resin imparts a high luster to a coat film or printed picture produced from such a pigment.

Hitherto, a variety of aqueous dispersions containing various resins are known. For example, an aqueous dispersion of polyurethane useful for dispersing pigments in paints and print ink is well known. Japanese Laid Open Patent Publication No. 88-37809 teaches an aqueous dispersion of polyurethane having an acid value exceeding 20, which is obtained by reacting the polyol, exemplified by the general formula shown below, with a urethane based pre-polymer having isocyanate groups at its end.

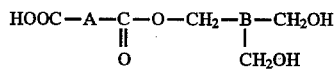

where A is a bivalent organic substituent group selected from the group consisting of

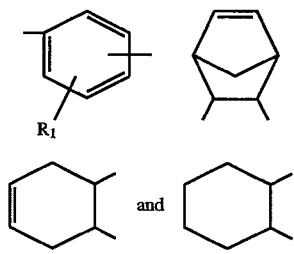

where R1 is one of H, COOH and alkyl group, and B is a trivalent aliphatic rest group.

The prominent problem extant among conventional aqueous dispersions composed of resins of such polyurethanes is the defects on films produced by the pigments, even though such conventional aqueous dispersions exhibit superior pigment dispersability properties. Indeed, the coat films and pictures produced from pigments dispersed in such conventional aqueous dispersions exhibit substantially inferior luster.

To avoid such defects, the prior art proposes an aqueous polyurethane dispersion which is obtained through the poly-addition of the polyol having a number average molecular weight of from 200 to 4000 and organic di-isocyanate. Alternatively, the aqueous polyurethane dispersion is the product of the poly-addition of the polyol with a urethane based pre-polymer, having isocyanate groups at its end.

The polyurethane, according to this publication, is obtained by reacting a chain extender, usually a di-methylol propionic acid with a vinyl based monomer. See Japanese Laid-Open Patent Publication No. 84-157102.

However, significant issues remain unaddressed among prior art aqueous dispersions. A major disadvantage is its low pigment dispersability. This drawback, in turn, prevents the aqueous resin dispersions from imparting sufficient luster to the coat film or printed pictures.

Generally, polyurethane is capable of adhering to various substrates, particularly hydrophobic base materials. However, polyurethane is unable to effectively wet the surface of pigment particles contained in ordinary paints and printing inks. As such, prior art aqueous dispersions are unable to impart high luster and color quality to the derived products utilizing the paints or printing inks.

Longstanding problems remain to be solved by the subject matter of the present invention.

OBJECTS AND SUMMARY OF THE INVENTION

In view of the above problems, it is an object of the present invention to provide an aqueous dispersion which overcomes the drawbacks of the prior art aqueous dispersions.

It is another object of the invention to provide an aqueous dispersion of a urethane vinyl based composite resin which possesses superior pigment dispersability properties and provides for a superior coat and glossy prints.

Briefly, the present invention provides an aqueous dispersion containing urethane vinyl composite resin which exhibits superior dispersability properties. The composite resin is obtained by graft polymerizing vinyl monomers with dispersable polyurethane. The polyurethane exhibits an acid value of at least 20. The dispersable polyurethane is obtained by reacting a urethane prepolymer having isocyanate groups at its end with a polyol compound obtained by the semi-esterification of polycarboxylic acid with benzene rings or its anhydride with trimethylol ethane or trimethylol propane. The urethane prepolymer is produced by reacting polyol compounds with poly-isocyanate compounds and ranges in molecular weight of from about 300 to 5000.

According to a feature of the present invention, there is provided an aqueous dispersion of a composite resin which includes a urethane vinyl based composite resin. The composite resin is obtained by graft polymerizing vinyl monomers with a dispersable polyurethane, wherein said polyurethane has an acid value of at least 20. The polyurethane is obtained by reacting a urethane prepolymer having isocyanate groups at its end with a polyol compound generally represented by the following formula (formula 1):

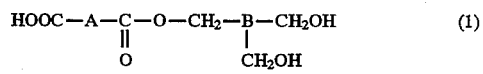

where A is a bivalent organic rest group selected from the group consisting of

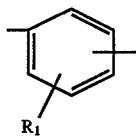

R1 is one of H, COOH and alkyl group, and B is a trivalent aliphatic rest group.

In view of the above, the object of this invention is to provide an aqueous dispersion of urethane vinyl based composite resin with good pigment particle dispersability which can bring out the high luster of dried coat films or printed pictures, and is useful as the pigment dispersion medium of aqueous paint or printing ink.

The above, and other objects, features and advantages of the present invention will become apparent from the following description read in conjunction with the examples.

DETAILED DESCRIPTION OF PREFERRED EMBODIMENT

The invention contemplates an aqueous dispersion containing urethane vinyl composite resin (hereinafter referred to as "the composite resin"), which exhibits superior dispersability properties.

The contemplated composite resin is a urethane vinyl based composite resin. The composite resin is obtained by graft polymerizing vinyl monomers with dispersable polyurethane, having an acid value of at least 20. The dispersable polyurethane suitable for the invention preferably is a product of a process wherein a starting compound of said process is a polyol ingredient generally represented by the following chemical formula (formula 1):

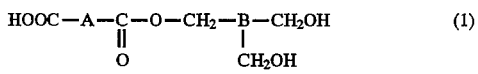

(1)

where A is a bivalent organic rest group selected from the group consisting of

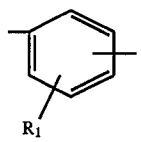

R1 is one of H, COOH and alkyl group, and B is a trivalent aliphatic rest group.

The preferred composite resin contained in the desired aqueous dispersion is composed of the following elements, described hereinafter.

DISPERSABLE POLYURETHANE

The dispersable polyurethane may be obtained by reacting the polyol generally represented by formula 1, supra, with a urethane pre-polymer having isocyanate groups at its end. This urethane pre-polymer can be produced by reacting polyol compounds with poly-isocyanate compounds. The pre-polymer thus prepared should preferably have a number average molecular weight of from about 300 to 5000, preferably from about 800 to 3000.

POLYOL COMPOUNDS

Polyol generally refers to polyhydric alcohols. Suitable polyol compounds are exemplified by conventional polyol compounds including polyester polyol and their mixtures. If the esterification product of rosin (including various types of rosin derivatives) and polyhydric alcohol is used for part or all of the polyol compound, the ultimate adhesion of urethane vinyl based composite resin to plastic film, particularly polyolefin film can be improved significantly.

The polyol compound represented by formula 1 is prepared by the semi-esterification of poly-carboxylic acid with a benzene ring structure exemplified by one of a phthalic acid; trimellitic acid (also commonly known as benzenetricarboxylic acid), etc. and their anhydrides, and an aliphatic compound having at least 3 hydroxyl groups.

POLY-ISOCYANATE

Suitable polyisocyanate compounds include any aromatic, alicyclic and aliphatic isocyanates exemplified by one of toluene diisocyanate (TDI), xylylene diisocyanate (XCI), diphenylmethane diisocyanate (MDI), isophorone diisocyanate (IPDI), hexamethylene diisocyanate (HDI), etc. and their mixtures.

ALIPHATIC COMPOUND

Suitable aliphatic compounds include trimethylol ethane, trimethylol propane, glycerol, pentaerythritol, etc. It is preferable to use trimethylol ethane and trimethylol propane for the aliphatic compound.

The reaction of urethane polymer with the polyol compound exemplified by formula 1 is similar to the method used for synthesizing normal polyurethane. The desired dispersable polyurethane can be prepared by using an organic solvent such as methyl-ethyl ketone (MEK), ethyl acetate, dimethylformamide, dioxane or N-methyl-2-pyrolidone as the reaction medium, and reacting the urethane prepolymer with polyol in the presence or absence of urethanization catalyst at a temperature of 30° C. to 150° C., preferably from 40° C. to 100° C.

The acid value of the thus obtained polyurethane can be adjusted by changing the amount of urethane prepolymer and the polyol compound used in the reaction. For example, in order to obtain the desired polyurethane, one having an acid value of at least 20, it is preferable to limit the amount of the urethane polymer and the polyol compound exemplified by formula 1 to a range of from 1 mol (urethane polymer) to from 0.5 to 1.5 mol of the polyol compound generally represented by formula 1.

An alternative method to form the polyurethane contemplates reacting all three (3) compounds at the same time, e.g., the raw material to form the pre-polymer exemplified by the reaction between the polyol compound and the poly-isocyanate compound together with the polyol compound represented by chemical formula 1.

Note, however, that if the unsaturated group for polymerization is introduced into the polyurethane prior to its preparation, the graft efficiency in the graft polymerization of vinyl monomer with polyurethane is improved significantly.

The urethane vinyl composite resin according to the invention is prepared by the graft polymerization of vinyl monomers with the above prepared polyurethane.

VINYL MONOMERS

Suitable vinyl monomers for preparing the desired composite resin include one of (meth) ester acrylate such as methyl (meth) acrylate, ethyl (meth) acrylate, butyl (meth) acrylate, isobutyl (meth) acrylate, 2-ethyl hexyl (meth) acrylate, lauryl (meth) acrylate, stearyl (meth) acrylate, benzyl (meth) acrylate, glycidyl (meth) acrylate, 2-hydroxyl ethyl (meth) acrylate, etc.

Additional vinyl monomers include aromatic vinyl monomers such as styrene, alpha-methyl styrene. vinyl toluene, etc., together with vinyl ester monomers such as vinyl acetate, vinyl propionate, etc.; (meth) acrylamide monomers such as (meth) acrylamide, N-alkyl (meth) acrylamide, diaceton (meth) acrylamide, etc.; vinyl ether monomers such as methyl vinyl ether and the like, and other vinyl and acryl based monomers.

The graft polymerization of vinyl monomers with polyurethane is achieved by adding vinyl monomers directly to the polyurethane in the form of an organic solvent solution. Alternatively, the organic solvent polyurethane solution can be converted into an aqueous dispersion followed by adding the vinyl monomers to the thus obtained aqueous dispersion.

The step of converting the organic solvent polyurethane solution into the aqueous dispersion may include adding appropriate inorganic or organic alkali substances and water to the organic solvent polyurethane solution to neutralize the carboxyl groups contained in the polyurethane, followed by removing part or all of the organic solvent.

Ordinary azo or peroxide based radical polymerization initiators may be used for the graft polymerization. The initiators can be used in both an organic solvent and an aqueous medium. It is preferable that from 10 to 100 parts by weight of the vinyl monomers be reacted with 100 parts by weight of the polyurethane.

If the amount of the vinyl monomers is less than 10 parts by weight, the overall luster imparted to the coat film or print surface of the paint or ink dispersed in the aqueous resin medium is drastically reduced. Alternatively, if the amount of the reacting vinyl monomers exceed 100 parts by weight, then the aqueous resin composition becomes increasingly unstable.

The contemplated urethane vinyl composite resin produced by the graft polymerization described above can be obtained as an organic solvent solution if the graft polymerization is done in an organic solvent. On the other hand, it can also be obtained as an aqueous dispersion if the graft polymerization is performed in an aqueous medium.

In the former case, the aqueous dispersion of this composite resin can be made by adding an appropriate alkali substance and water to the organic solvent solution to neutralize the carboxyl groups contained in the composite resin. and then removing the organic solvent.

The urethane vinyl composite resin according to the invention contains the polyol compound shown by formula 1. The polyol compound is extremely dispersable. This property, in turn, provides the composite resin with the ability to aqueously disperse pigments in a stable and even manner.

Likewise, the vinyl polymers, formed after the graft polymerization, contained in the composite resin, are easily adsorbed to the pigment particle surfaces. This property, in turn, provides for highly lustrous coat films, which is produced by the pigments dispersed in the aqueous dispersion of the composite resin.

It is therefore possible to obtain paints which produce highly lustrous coats or print inks which produce glossy pictures by using the aqueous dispersion of the present invention. This is made possible by effectively dispersing the pigments used traditionally in paints and print inks, e.g., titanium dioxide, watching red, cyanine blue, leonol yellow, carbon black in the aqueous composite resin dispersion of the present invention.

Examples embodying the contemplated aqueous dispersion of the composite resin according to the present invention will be described hereinafter.

EXAMPLE 1 a) Preparation of polyurethane

| | |
|---|---|
| Polypropylene glycol (molecular weight: 2000) | 18 parts by wt. |
| Polycaprolactam glycol (molecular weight: 2000) | 52 parts by wt. |
| Hydrogenated rosin ester (OH value: 140) | 40 parts by wt. |
| Isophorone diisocyanate (IPDI) | 37.74 parts by wt. |
| MEK | 100 parts by wt. |

To form the urethane prepolymer, the above specified materials were placed in a reactor and reacted for about three (3) hours at temperatures ranging from about 70° to about 80° C. under a dried nitrogen gas flow. Thereafter, 42.45 parts by weight of the compound shown generally by formula 2, described hereinafter, 11.1 parts by weight of isophoron diisocyanate (IPDI) and 30 parts by weight of MEK were added to the thus formed prepolymer. The compound were allowed to react for two (2) hours temperatures ranging from about 70° to about 80° C. Then, 2 parts by weight of 2-hydroxy ethyl methacrylate was added to the resultant product and the constituents were allowed to react for an additional one (1) hour to finally yield a polyurethane MEK solution.

The resultant polyurethane had 0.0076 mol unsaturated group for polymerization per 100 g resin. The polyurethane also had an acid value of about 72.

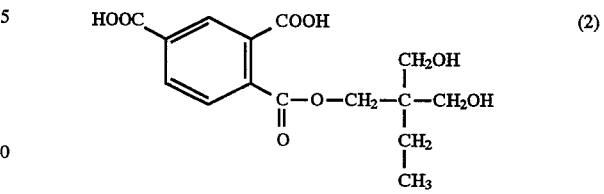

b) Graft polymerization
Composition of the vinyl monomer solution

| | |
|---|---|
| Isobutyl methacrylate (IBMA) | 81 parts by wt. |
| Azobisisobutyronitrile (ABN-R) | 1.62 parts by wt. |
| MEK | 100 parts by wt. |

The vinyl monomer solution prepared as above, was dripped for about 30 minutes into the polyurethane MEK solution obtained in step a above. During this step, the temperature of the solution was maintained at 70° C. After the completion of the drip, the temperature of the solution was raised and maintained at a range of from 70° to about 80° C. for about two and one half hours (2.30) to complete the graft polymerization.

The urethane/vinyl weight ratio of the thus obtained urethane vinyl based composite resin is about 2.5:1.

c) Preparation of an aqueous dispersion 26.3 parts by weight of triethylamine (TEA), having an acid value substantially equal to the acid value of the MEK solution of urethane vinyl based composite resin obtained in step b above, and 500 parts by weight of ion exchange water were added to and dispersed in the MEK solution.

Then, 20 parts by weight of an aqueous solution containing 0.34 parts by weight of diethylene triamine (DETA) were added to the above MEK solution. The MEK solution was then agitated for 30 minutes while the temperature of the solution was maintained at 40° C.

Thereafter, the thus formed solution was distilled further to remove most of the MEK. followed by an additional distillation in a vacuum. Then a small amount of aqueous ammonia was added in order to adjust the pH of the solution to be about 9. The resultory aqueous dispersion exhibited a good appearance and contained 45% non-volatile matter.

EXAMPLE 2 a) Preparation of aqueous polyurethane solution

A polyurethane MEK solution was obtained in the same manner as step a of example 1.

Immediately thereafter, 26.3 parts by weight of triethylamine and 500 parts by weight of ion exchange water were added to and dispersed in the polyurethane MEK solution.

Then, 20 parts by weight of a solution containing 0.34 parts by weight of diethylene triamine were added to the solution. The solution was then agitated for 30 minutes. Thereafter, the agitated solution was distilled to remove the MEK followed by an additional distillation in a vacuum.

After the distillation in a vacuum, a small amount of aqueous ammonia was added to the solution, effective to adjust the pH to 9 to yield a transparent aqueous polyurethane solution.

b) Emulsification graft polymerization 81 parts by weight of isobutyl methacrylate and 82 parts by weight of ion exchange water were added to the aqueous polyurethane solution obtained in step a above. The temperature of the solution was then raised to 40° C. while the solution was agitated under a flow of nitrogen gas. Thereafter, 10 parts by weight, of aqueous 2% ammonium persulfate (APS) and 10 parts by weight of aqueous 2% sodium hydrogen sulfite (SBS) were added to the solution to facilitate the emulsification polymerization of the solution. Soon after the start of the reaction between the various constituents, the temperature of the solution was raised to a temperature of from 70° to 75° C.

The solution was maintained at this temperature for about 1 hour. Soon thereafter, 1 part by weight of the aqueous solution containing 0.04 parts by weight of APS was added and reacted for another 2 hours.

The thus obtained aqueous dispersion exhibited superior external appearance and contained 40% non-volatile matter.

COMPARISON EXAMPLE 1 a) Preparation of polyurethane

A polyurethane MEK solution was prepared in the same manner as step a of example 1 except that 17.42 parts by weight of dimethylol propionic acid (DMPA) was used in place of the compound represented by chemical formula 2 used in example 1. The substituted compound was equal in mol to the compound represented by chemical formula 2. Also, the amount of hydroxyethyl methacrylate used was reduced from 2 parts by weight to 1.75 parts by weight.

The resultant polyurethane had an acid value of 41 and contained 0.0076 mol unsaturated groups per 100 g of the resin.

b) Graft polymerization

A vinyl monomer solution containing the ingredient described below was dripped on the polyurethane MEK solution obtained in step a above for about 30 minutes while the solution was maintained at 70° C. After completion of the drip, the solution was maintained at a temperature of from 70° to about 80° C. for an additional period of time of about two and one half hours (2½ hrs) in order to complete the graft polymerization.

Composition of the vinyl monomer solution

| Isobutylmethacrylate | 81 parts by weight |
| Azobisisobutyronitrile | 1.62 parts by weight |
| MEK | 100 parts by weight. |

The weight ratio of urethane to vinyl in the thus obtained urethane vinyl composite resin was about 2.2 to 1.

c) Preparation of an aqueous dispersion

To the urethane vinyl composite resin obtained in step b above, were added and dispersed therein, 13.2 parts by weight of triethylamine together with 500 parts by weight of ion exchange water and 20 parts by weight of an aqueous solution containing 0.34 parts by weight of diethylene triamine. The triethylamine exhibited an acid value substantially equal to that of the composite resin of the present invention. After addition of the aqueous solution, the mixture was agitated for about 30 minutes at a temperature of about 40° C.

Thereafter, the solution was distilled to remove the MEK, and then distilled again in a vacuum. Following the second distillation, a small amount of aqueous ammonia was added to the distilled solution. The aqueous ammonia was added to adjust the pH of the solution to 9. The resultory alkaline aqueous dispersion exhibited a good external appearance and contained 40% non-volatile matter.

COMPARISON EXAMPLE 2

An aqueous dispersion solution was obtained in a manner similar to steps a and c of comparison example 1 except that the vinyl monomer solution with the ingredient composition shown below was used in place of the vinyl monomer solution used in step b of comparison example 1.

Composition of vinyl monomer solution

| Isobutylmethacrylate | 71 Parts by wt. |
| Azobisisobutyronitrile | 1.42 parts by wt. |
| MEK | 90 parts by wt. |

The urethane/vinyl weight ratio in the urethane vinyl composite resin contained in this aqueous dispersion was about 2.5:1.

COMPARISON EXAMPLE 3 a) Preparation of aqueous polyurethane

For this example, polyurethane, having an acid value similar to the polyurethane in example 1, was prepared by the method employed in example 1. The solution and reactants are listed hereinafter. Also, dimethylol propionic acid was used instead of the polyol compound used in example 1, represented by formula 2.

| Polypropylene glycol (number av. mol. wt. 2000) | 12.42 parts by wt. |
| Polycaprolactam glycol (number av. mol. wt. 2000) | 35.86 parts by wt. |
| Dimethylol propionic acid | 33.53 parts by wt. |
| IPDI (initially) | 32.07 parts by wt. |
| Hydrogenated rosin ester (OH value: 140) | 38.53 parts by wt. |
| IPDI (second time) | 40.62 parts by wt. |
| 2-hydroxyethyl methacrylate | 1.92 parts by wt. | b) Graft polymerization

Graft polymerization was conducted in the same manner as example 1, except that the vinyl monomer solution was composed of the following:

| Isobutylmethacrylate | 78.00 parts by wt. |
| Azobisisobutyronitrile | 1.56 parts by wt. |
| MEK | 100 parts by wt. | c) Preparation of aqueous dispersion

The aqueous dispersion was prepared in a manner similar to the one employed in example 1, except for the following changes in the amounts of the reagents used:

| Triethylamine | 25.30 parts by wt. |
| Diethylenetriamine | 0.34 Parts by wt. |

The composition of the composite resin in the aqueous dispersion obtained above, the resin acid value, the content of the hydrogenated rosin ester, and the weight ratio of polyurethane and polyisobutyl methacrylate ingredients were substantially the same as in the example 1.

The weight ratio of polypropylene glycol and polycaprolactam glycol used was also similar to the weight ration of example 1.

COMPARISON EXAMPLE 4 a) Preparation of the polyurethane solution.

For this example, a polyurethane MEK solution was prepared in the same manner as step 1 of example 1. An aqueous polyurethane dispersion was prepared using the materials and methods used in step a of comparative example 3.

b) Emulsification graft polymerization.

For this step, the graft polymerization was performed in the same manner as example 2. Thereafter, isobutylmethacrylate, APS and SBS were added to the aqueous polyurethane solution obtained in step a above, in the same manner as step b of example 2 to aid in the emulsification graft polymerization. The desired end product e.g., emulsion exhibited good external appearance containing 40% non-volatile matter.

Table 1 shows the amount of the reagents used and the characteristics of the polyurethane resin obtained in examples 1 and 2, and comparison examples 1 to 4.

TABLE 1

|  | Emb.1 | Emb.2 | Com.1 | Com.2 | Com.3 | Com.4 |
|---|---|---|---|---|---|---|
| Polyurethane |  |  |  |  |  |  |
| PPG | 18 | 18 | 18 | 18 | 12.42 | 12.42 |
| PCG | 52 | 52 | 52 | 52 | 35.86 | 35.86 |
| Hydrogenated rosin ester | 40 | 40 | 40 | 40 | 38.53 | 38.53 |
| IPDI | 34.74 | 34.74 | 37.74 | 37.74 | 32.07 | 32.07 |
| Compound w/ chemical formula (2) | 42.45 | 42.45 | — | — | — | — |
| DMPA | — | — | 17.42 | 17.42 | 33.53 | 33.53 |
| IPDI | 11.1 | 11.1 | 11.1 | 11.1 | 40.62 | 40.62 |
| 2-HEMA | 2 | 2 | 1.75 | 1.75 | 1.92 | 1.92 |
| Characteristics of Polyurethane |  |  |  |  |  |  |
| Acid Value | 72 | 72 | 41 | 41 | 72 | 72 |
| Contents of unsaturated group (mol/100 g) | 0.0076 | 0.0076 | 0.0076 | 0.0076 | 0.0076 | 0.0076 |
| Graft polymerization |  |  |  |  |  |  |
| IBMA | 81 | 81 | 81 | 71 | 78 | 78 |
| ABN-R | 1.62 | — | 1.62 | 1.42 | 1.56 | — |
| APS | — | 0.2/0.04 | — | — | — | 0.2/0.04 |
| SBS | — | 0.2 | — | — | — | 0.2 |
| Preparation of aqueous dispersion |  |  |  |  |  |  |
| TEA | 26.3 | 26.3 | 13.2 | 13.2 | 25.3 | 25.3 |
| DETA | 0.34 | 0.34 | 0.34 | 0.34 | 0.34 | 0.34 |

Test 1

The aqueous dispersions obtained in examples 1 and 2, and comparison examples 1 to 4 together with the aqueous polyurethane solutions obtained in examples 2 a) and comparable example 4 a), (hereinafter referred to as comparison examples 5 and 6) were each used as a pigment dispersant to prepare pigment dispersions A and B whose compositions appears below.

Pigment Dispersion A

| Titanium dioxide pigment in the market | 30 parts by wt. |
| Dispersant (resin part counted) | 15 parts by wt. |
| Isopropyl alcohol | 20 parts by wt. |

Balance substantially ion exchange water to provide 100 parts by weight of pigment dispersion A.

The above materials were placed in a plastic container with 150 parts by wt. of glass beads, kneaded together for one hour with a paint shaker to filter off the glass beads and obtain a white Pigment dispersion.

Pigment Dispersion B

| Conventional watching red pigment | 15 parts by wt. |
| Dispersant (resin part counted) | 15 parts by wt. |
| Isopropyl alcohol | 20 parts by wt. |

Balance substantially ion exchange water to prepare 100 parts by weight of pigment dispersion B.

The above materials were treated in the same manner as pigment dispersion A to yield a red pigment dispersion.

Each of these pigment dispersions was placed in a transparent glass container and left calm to observe the liquid stability changes with the passage of time by watching the settlings generated. Further each pigment dispersion was developed over a plastic film with a bar coater (manufactured by Imex and measuring about 0.2 mm in wire diameter).

Then, the plastic film was dried and 60° gloss was measured by means of a gloss meter (manufactured by Nihon Denshoku Kogyo Co. Ltd.). Refer to Table 2 for the results of the measurements.

TABLE 2

|  | Pigment dispersion A | | Pigment dispersion B | |
|---|---|---|---|---|
|  | Stability | 60° gloss | Stability | 60° gloss |
| Example 1 | Good | 53 | Good | 92 |
| Example 2 | Good | 52 | Good | 90 |
| Com. Ex. 1 | Bad | 11 | Bad | 20 |
| Com. Ex. 2 | Bad | 12 | Average | 23 |
| Com. Ex. 3 | Bad | 7 | Bad | 20 |
| Com. Ex. 4 | Bad | 2 | Bad | 3 |
| Com. Ex. 5 | Good | 31 | Good | 61 |
| Com. Ex. 6 | Bad | 8 | Bad | 21 |

Evaluation of stability:
Good: Few settlings
Average: Some settlings, can be re-dispersed.
Bad: Settlings are difficult to be re-dispersed.

EXAMPLE 3 a) Preparation of polyurethane

| | |
|---|---|
| Polycaprolactam glycol (number av. mol. wt.: 500) | 15 parts by wt. |
| Polycaprolactam glycol (number av. mol. wt.: 1250) | 68.75 parts by wt. |
| Dimethylol Propionic acid | 2.01 parts by wt. |
| MEK | 50 parts by wt. |

To form the urethane prepolymer, the above specified materials were placed in a reactor at a temperature of about 70° C. The materials were reacted under a dried nitrogen gas flow. Thereafter, 44.40 parts by weight of isophorone diisocyanate (IPDI) and 25 parts by weight of MEK were added and the reagents were allowed to react for about two (2) hours. at temperature of from 70° to 80° C.

Then, 16.33 parts by weight of a compound KA 4, shown generally by formula 2, together with 1.35 parts be weight of 1,4-butane diol and 25 parts by weight of MEK ere added to the mixture and allowed to react for about two (2) hours. Thereafter, 2.60 parts by weight of 2-hydroxy ethyl methacrylate was added to the resultory product and allowed to react for an additional one (1) hour to finally yield a polyurethane MEK solution.

The resultory polyurethane contained 0.0133 mol unsaturated group for polymerization per 100 g resin. The polyurethane also had an acid value of about 43.

b) Graft polymerization

Composition of the vinyl monomer solution

| | |
|---|---|
| Methylmethacrylate | 50 parts by wt. |
| Isobutylmethacrylate (IBMA) | 25 parts by wt. |
| Azobisisobutyronitrile (ABN-R) | 1.50 parts by wt. |
| MEK | 50 parts by wt. |

The vinyl monomer solution prepared as above, was dripped into the polyurethane MEK solution obtained in step a, above, for about 30 minutes. During this step, the temperature of the solution was maintained at 70° C. After the completion of the drip, the temperature of the solution was maintained at a range of from 70° to about 80° C. for about two and one half hours (2.30 hrs) to complete the graft polymerization.

The urethane/vinyl weight ratio in the resultory urethane vinyl composite resin was about 2:1.

c) Preparation of an aqueous dispersion 11.6 parts by weight of triethylamine (TEA), substantially equal in amount to the carboxy groups contained in the resin together with 450 parts by weight of ion exchange water were added to and dispersed in the urethane vinyl composite resin MEK solution obtained in step b, above. The reagents are mixed and agitated for about 30 minutes.

Then 60 parts by weight of an aqueous solution containing 1.72 parts by weight of diethylene triamine (DETA) was added to the above MEK solution and agitated for thirty (30) minutes. The temperature of the solution was maintained at 40° C.

Thereafter, the thus formed solution was distilled to remove the MEK, followed by an additional distillation in a vacuum. Then a small amount of aqueous ammonia was added in order to adjust the pH of the solution to be about 9. The resultory aqueous dispersion exhibited a good appearance.

EXAMPLE 4 a) Preparation of aqueous polyurethane solution.

An aqueous semi-transparent polyurethane solution was obtained by the dispersion treatment recited in step c of example 3, without, the graft polymerization step (step b) of example 3.

b) Emulsification graft polymerization 50 parts by wt. of methylmethacrylate, 25 parts by wt. of isobutylmethacrylate and 110 parts by wt. of ion exchange water were added to the above aqueous polyurethane solution. Then the temperature was raised to 40° C. while the solution was agitated under a nitrogen gas flow.

Then, 20 parts by wt. of 2% aqueous persulfite ammonium solution (APS) and 20 parts by wt. of 2% aqueous sodium bisulfite solution (SBS) were added to start the emulsification polymerization.

After raising its temperature up to 70°–75° C. and keeping the solution for one (1) hour at this temperature, 1 part by weight of an aqueous solution containing 0.04 parts by wt. of APS was added to the solution and the reaction was allowed to continue for another two (2) hours.

The resultant aqueous dispersion produced according to this example also exhibited a satisfactory external appearance.

COMPARISON EXAMPLE 7

A polyurethane MEK solution with unsaturated groups was obtained using 6.7 parts by wt. of the dimethylol propionic acid instead of the compound with chemical formula 2, used in the example 3. The procedure employed to prepare the MEK solution was the same as example 3. The dimethylol propionic acid was equal in mol to the compound represented by formula 2. Thereafter, graft polymerization step and an aqueous dispersion was prepared in similar fashion to example 3 except that the amount of vinyl monomers used was reduced such that the weight ratio of vinyl monomers to polyurethane was equal to that of example 3 e.g. weight ratio of urethane/vinyl was 2:1. However, a stable dispersion was not obtained.

COMPARISON EXAMPLE 8 a) Preparation of aqueous polyurethane

For this example, polyurethane, having an acid value similar to the polyurethane in example 3, was prepared by the method employed in example 3. The solution and reactants are listed hereinafter. Also, dimethylol propionic acid was used instead of the polyol compound used in example 3.

| | |
|---|---|
| Polycaprolactam glycol (number av. mol. wt.: 500) | 15 parts by wt. |
| Polycaprolactam glycol (number av. mol. wt.: 1250) | 68.74 parts by wt. |
| Dimethylol propionic acid (initially) | 2.01 parts by wt. |
| IPDI (initially) | 44.40 parts by wt. |
| IPDI (second time) | 13.32 parts by wt. |
| Dimethylol propionic acid (second time) | 14.74 parts by wt. |
| 2-hydroxyethyl methacrylate | 2.80 parts by wt. |
| 1,4-butane diol | 1.35 parts by wt. | b) Graft polymerization

Graft polymerization was conducted in the same manner as example 3, except that the vinyl monomer solution was composed of the following:

| | |
|---|---|
| Methylmethacrylate | 54.00 parts by wt. |
| Isobutylmethacrylate | 27.00 parts by wt. |
| Azobisisobutyronitrile | 1.62 parts by wt. |
| MEK | 55 parts by wt. | c) Preparation of aqueous dispersion

The aqueous dispersion was prepared in a manner similar to the one employed in example 3, except for the following changes in the amounts of the reagents used:

| | |
|---|---|
| Triethylamine | 12.63 parts by wt. |
| Diethylenetriamine | 1.72 parts by wt. |

The weight ratio of polyurethane and polyisobutyl methacrylate ingredients in the composite resin contained in the aqueous dispersion made according to this example was substantially the same as in the example 3.

Table 3 shows the amount of reagents used and the characteristics of the polyurethane resin in examples 3 and 4, and comparison examples 7 and 8.

TABLE 3

| | Emb.3 | Emb.4 | Com.7 | Com.8 |
|---|---|---|---|---|
| Polyurethane | | | | |
| PCG (MW = 500) | 15 | 15 | 15 | 15 |
| PCG (MW = 1250) | 68.75 | 68.75 | 68.75 | 68.75 |
| DMPA | 2.01 | 2.01 | 2.01 | 2.01 |
| IPDI | 44.40 | 44.40 | 44.40 | 44.40 |
| The compound w/ chemical formula (2) | 16.33 | 16.33 | — | — |
| DMPA | — | — | 6.70 | 14.74 |
| 1, 4-BDO | 1.35 | 1.35 | 1.35 | 1.35 |
| IPDI (2) | — | — | — | 13.32 |
| 2-HEMA | 2.60 | 2.60 | 2.43 | 2.80 |
| Characteristics of polyurethane | | | | |
| Acid Value | 43 | 43 | 26 | 43 |
| Amount of unsaturated group (mol/100 g) | 0.0133 | 0.0133 | 0.0133 | 00133 |
| Graft Polymerization | | | | |
| MMA | 50 | 50 | 47 | 54 |
| IBMA | 25 | 25 | 23 | 27 |
| ABN-R | 1.50 | — | 1.40 | 1.62 |
| APS | — | 0.4/0.04 | — | — |
| SBS | — | 0.4 | — | — |
| Preparation aqueous the dispersion | | | | |
| TEA | 11.6 | 11.6 | 6.6 | 12.63 |
| DETA | 1.72 | 1.72 | 1.72 | 1.72 |

Test 2

The pigment dispersions C and D, like pigment dispersions A and B, were prepared using the respective aqueous dispersions obtained in examples 3 and 4, and comparison example 8. Similar to test 1, the stability and 60° gloss were also measured. The results are shown in Table 4.

TABLE 4

| | Pigment dispersion C | | Pigment dispersion D | |
|---|---|---|---|---|
| | Stability | 60° C. gloss | Stability | °C. gloss |
| Example 3 | Good | 55 | Good | 93 |
| Example 4 | Good | 52 | Good | 90 |
| Comparison Ex. 8 | Bad | 33 | Average | 56 |

EXAMPLE 5 a) Preparation of polyurethane

| | |
|---|---|
| Polypropylene glycol (number av. mol. wt.: 400) | 64 parts by wt. |
| Compound generally represented by formula 3 | 34.08 parts by wt. |
| Dioxane | 34 parts by wt. |

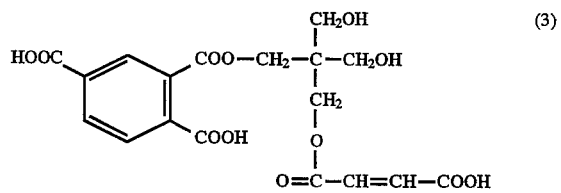

(3)

To form the polyurethane according to this example, the above specified materials were placed in a reactor. The temperature was then raised to 60° C. and the reagents allowed to react under a dried nitrogen gas flow. Thereafter, 35.53 parts by weight of isophorone diisocyanate (IPDI) and 25 parts by weight of MEK were added to the above and the reagents allowed to react for two (2) hours at temperatures ranging from about 70° to about 80° C.

Thereafter, 60 parts by weight of caprolactam glycol, molecular wt. 2000, together with 4.02 parts by weight of dimethylol propionic acid and 28.62 parts by weight of IPDI and 60 parts by weight of MEK were added to the above and reacted for an additional one (1) hour.

Then, 40 parts of hydrogenated rosin ester with an OH value of 140, together with 15,54 parts by weight of additional IPDI and 50 parts by weight of MEK were additionally added and the reaction allowed to proceed for another one (1) hour.

After that, 3 parts by weight of 2-hydroxy ethyl methacrylate was added and allowed to react with the above mixture for an additional one (1) hour to finally yield a polyurethane MEK solution have unsaturated groups. The resultory polyurethane MEK solution exhibited an acid value of 53 and included 0.0081 mol unsaturated group for polymerization per 100 g resin.

b) Graft polymerization

Composition of the vinyl monomer solution

| | |
|---|---|
| Methylmethacrylate | 170 parts by weight |
| Isobutylmethacrylate (IBMA) | 58 parts by wt. |
| Azobisisobutyronitrile (ABN-R) | 4.56 parts by wt. |
| MEK | 150 parts by wt. |

The vinyl monomer solution prepared as above, was dripped for about 30 minutes into the polyurethane MEK solution obtained in step a, above. During this step, the temperature of the solution was maintained at 70° C. After the completion of the drip, the temperature of the solution was maintained at a range of from 70° to about 80° C. for about two and one half (2.30) hours to complete the graft polymerization.

c) Preparation of a dispersion

Following the polymerization reaction in step b, above, 27.3 parts by weight of triethylamine (TEA), having an acid value substantially similar to the obtained resin together with 50 parts by weight of an aqueous solution containing 0.68 parts by weight of diethylene triamine (DETA) were added to the above MEK solution and agitated for thirty (30) minutes. Thereafter, the resultant solution was distilled in the same manner as example 1, followed by the addition of aqueous ammonia added to adjust the pH of the solution to about 9.

Test 3

The aqueous dispersion obtained in example 5 was used as the pigment dispersant to prepare pigment dispersions E whose compositions appears below:
- 40 parts by wt. of conventional Titanium dioxide
- 20 parts by weight of Dispersant (resin part counted)
- 10 parts by weight of Isopropyl alcohol
- Balance substantially composed of ion exchange water to provide 100 parts by weight of pigment dispersion E Pigment dispersion F was similar to pigment dispersion E except that the white pigment dispersion E referred to above was replace with a red pigment (watching red). In similar fashion, pigment dispersion G was similar to E except that the white pigment was replaced with a blue pigment (cyanine blue) while pigment dispersion H was yellow in that the white pigment was replaced with a yellow pigment (leonol yellow).

The stability of the above noted pigments dispersions E through H were measured in the same manner as in Test 1. The results are shown in Table 5.

TABLE 5

| Pigment Dispersion | E | F | G | H |
|---|---|---|---|---|
| Stability | Good | Good | Good | Good |
| 60° Gloss | 68 | 92 | 65 | 48 |

Having described preferred examples of the invention with reference to the data contained herein, it is to be understood that the invention is not limited to those precise examples, and that various changes and modifications may be effected therein by one skilled in the art without departing from the scope or spirit of the invention as defined in the appended claims.

What is claimed:

1. An aqueous dispersion of a composite resin comprising:

a urethane vinyl based composite resin;

said resin is obtained by graft polymerizing vinyl monomers with a dispersable polyurethane, wherein said polyurethane has an acid value of at least 20;

said polyurethane produced from a polyol compound generally represented by the following formula:

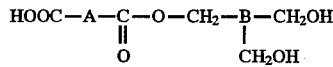

where A is a bivalent organic substituent group selected from the group consisting of

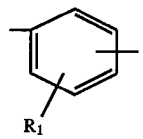

R1 is one of H, COOH or alkyl group, and B is a trivalent aliphatic substituent group.

2. The aqueous dispersion according to claim 1, wherein said polyurethane is obtained by reacting a urethane prepolymer having isocyanate groups at its end with a polyol compound generally represented by the following formula:

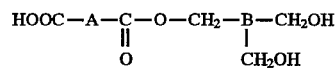

where A is a bivalent organic substituent group selected from the group consisting of

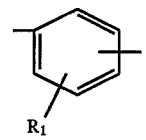

R1 is one of H, COOH or alkyl group, and B is a trivalent aliphatic substituent group.

3. The aqueous dispersion according to the claim 1, wherein said urethane has a number average molecular weight of from 300 to 5000.

4. The aqueous dispersion according to the claim 1, wherein said polyol compound is produced by a semi-esterification of polycarboxylic acid and an aliphatic compound, wherein said polycarboxylic acid includes at least two carboxylic acid groups substituted onto at least one benzene ring, and wherein said aliphatic compound is substituted by at least one hydroxyl group.

5. The aqueous dispersion according to claim 2, wherein said isocyanate group is one of an aromatic, alicyclic or aliphatic isocyanate.

6. The aqueous dispersion according to claim 2, wherein said urethane prepolymer having isocyanate groups at its end includes at least one member selected from the group consisting of toluene diisocyanate, xylene diisocyanate, diphenyl methane diisocyanate, isophorone diisocyanate, and hexamethylene diisocyanate.

7. The aqueous dispersion according to the claim 2, wherein a content of said vinyl monomer in said reaction with said polyurethane ranges from about 10 to about 100 parts by weight per 100 parts by weight of said polyurethane.

8. The aqueous dispersion according to the claim 7, wherein said monomer include at least one (meth) ester acrylate selected from the group consisting of methyl (meth) acrylate, ethyl (meth) acrylate, butyl (meth) acrylate, isobutyl (meth) acrylate, 2-ethyl hexyl (meth) acrylate, lauryl (meth) acrylate, stearyl (meth) acrylate, benzyl (meth) acrylate, glycidyl (meth) acrylate, and 2-hydroxyl ethyl (meth) acrylate.

* * * * *